United States Patent [19]
Mims

[11] Patent Number: 5,243,349
[45] Date of Patent: Sep. 7, 1993

[54] HIGH RESOLUTION SYNTHETIC APERTURE RADAR HAVING RECTILINEAR OUTPUT IMAGE FORMAT

[75] Inventor: James H. Mims, Millersville, Md.

[73] Assignee: Westinghouse Electric Corp., Pittsburgh, Pa.

[21] Appl. No.: 244,563

[22] Filed: Mar. 17, 1981

[51] Int. Cl.⁵ .................................. G01S 13/90
[52] U.S. Cl. .......................................... 342/25
[58] Field of Search ............ 343/5 CM, 5 FT; 342/25

[56] References Cited

U.S. PATENT DOCUMENTS

| | | | |
|---|---|---|---|
| 3,774,202 | 11/1973 | Nolette | 343/5 CM |
| 4,034,370 | 7/1977 | Mims | 343/5 CM |
| 4,339,752 | 7/1982 | Williams et al. | 343/5 CM |

*Primary Examiner*—T. H. Tubbesing
*Attorney, Agent, or Firm*—L. A. De Paul

[57] ABSTRACT

A method and apparatus for providing a constant scale factor in azimuth and synchronism of data blocks for a second stage fast Fourier transform in a synthetic aperture radar having two stages of FFT by varying the sampling rate at the output of the first stage FFT as an inverse function of range.

12 Claims, 11 Drawing Sheets

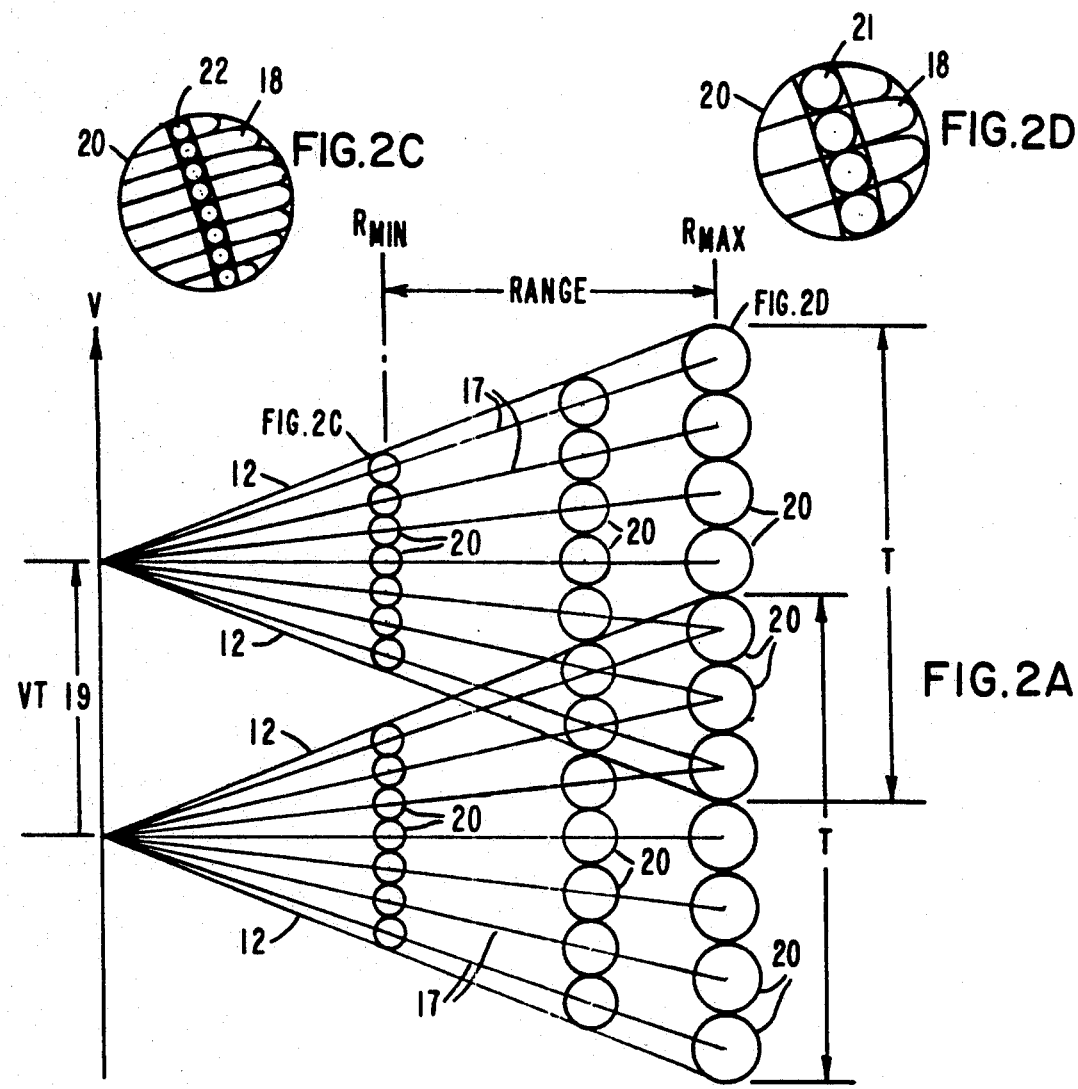
FIG.2A
FIG.2C
FIG.2D
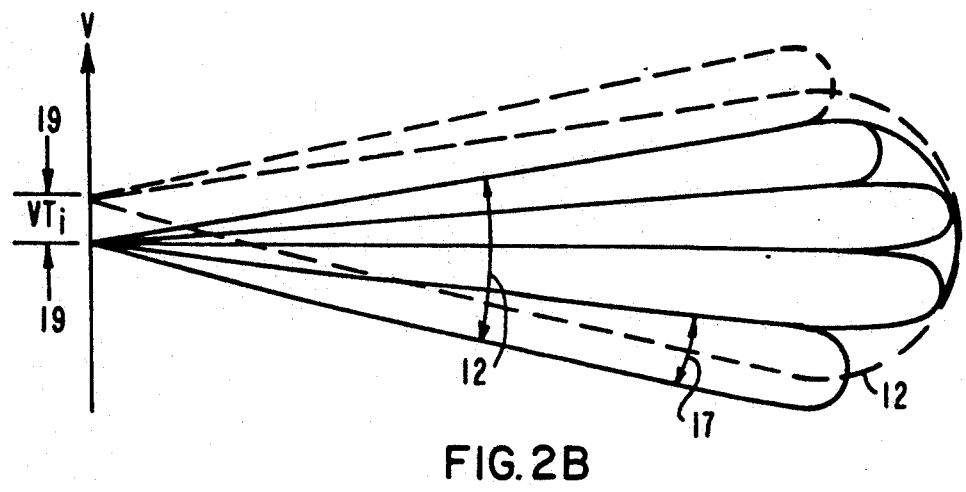
FIG.2B

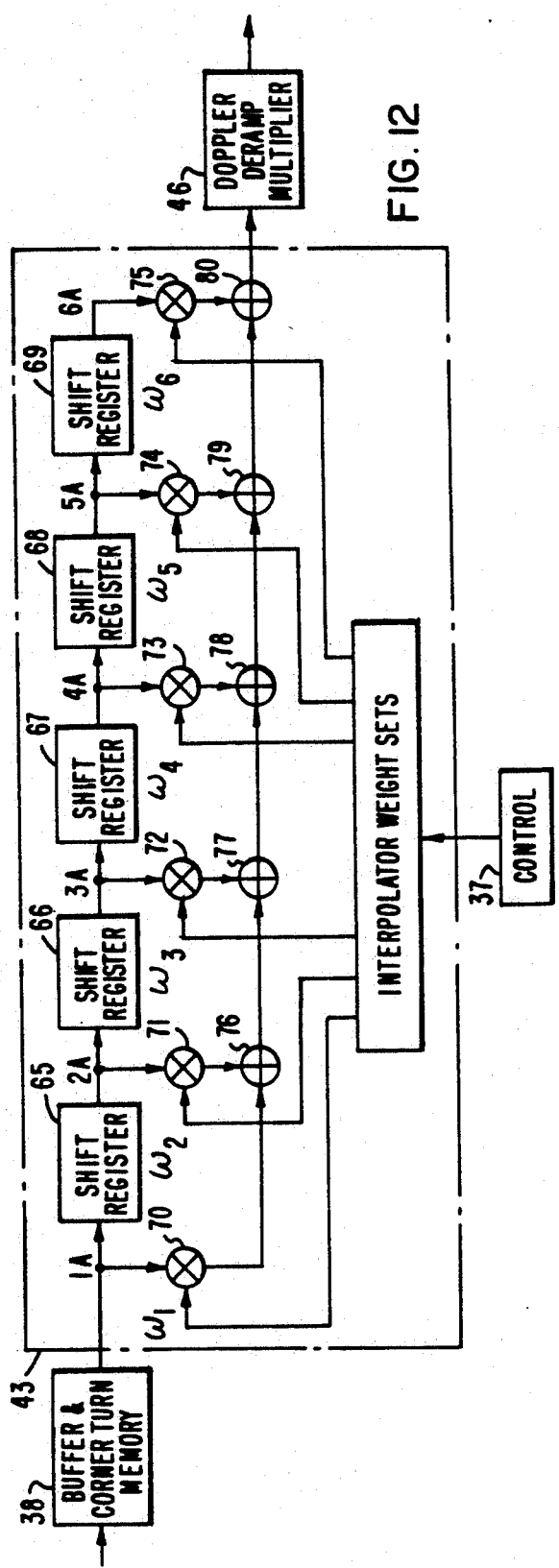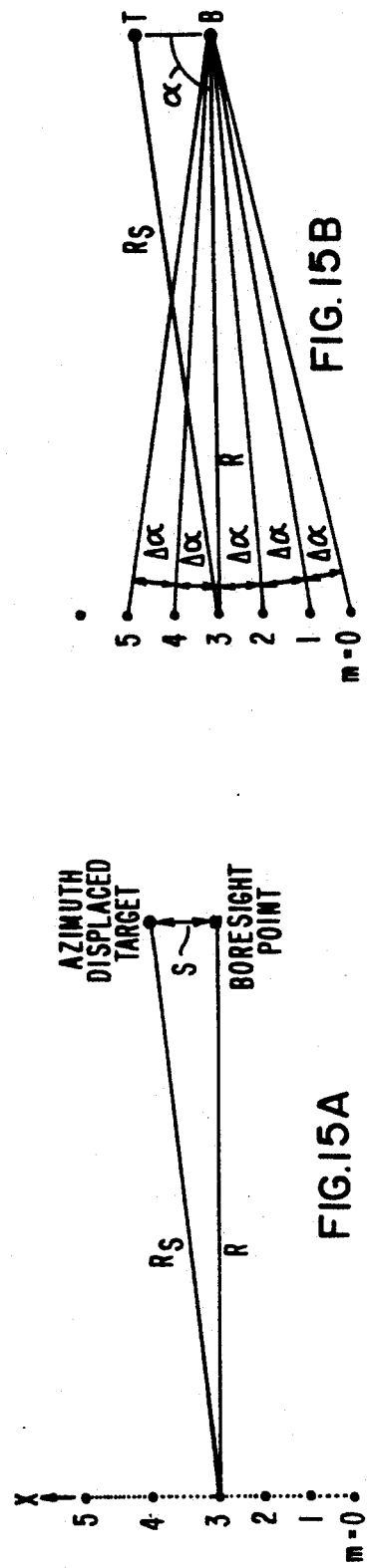

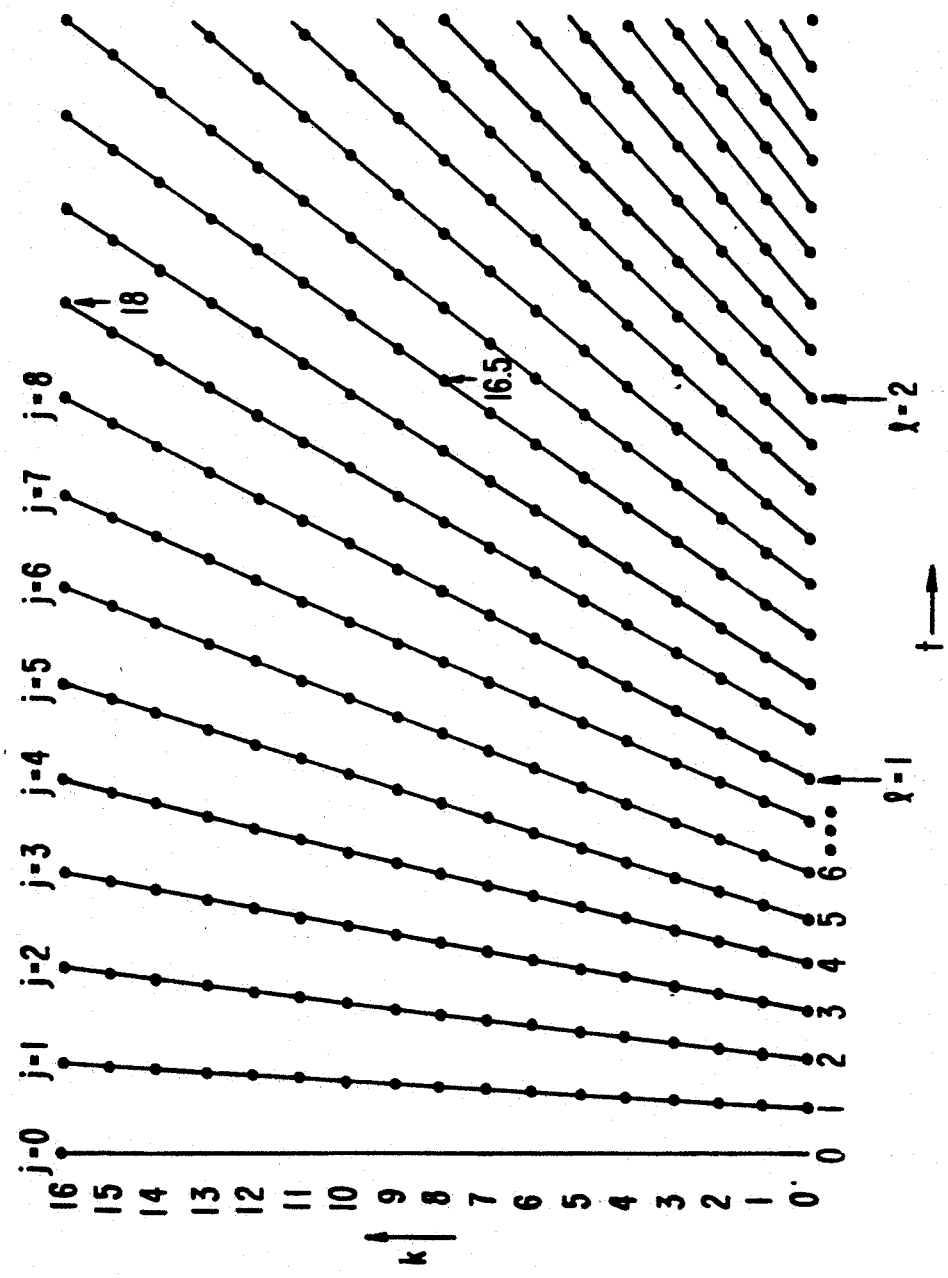

HIGH RESOLUTION SYNTHETIC APERTURE RADAR HAVING RECTILINEAR OUTPUT IMAGE FORMAT

BACKGROUND OF THE INVENTION

Synthetic aperture radar (SAR) is generally a system for forming an image or map of a terrain from a moving platform such as an aircraft, in which the return signals are processed to generate a set of relatively narrow synthetic beams in relation to the radiated beam.

More specifically, and referring to FIGS. 1A, 1B, 1C and 1D, there is disclosed a typical geometrical implementation of a synthetic aperture radar. The radar platform generally consists of a vehicle such as an aircraft 10 which carries the electronic equipment for radiating a scanning or fixed beam 12 resulting from the transmission of a radar pulse 14 and receiving the reflected radar return signal therefrom. The area of incidence of the transmitted radar pulse 14 comprises a swath in range $\Delta R_g$ and azimuth $\Delta_{az}$ with $\Delta R_g$ having a minimum range $R_{min}$ and a maximum range of $R_{max}$ directed along the azimuth boresight $R_O$. The geometry disclosed in FIGS. 1A and 1B is illustrative of a side look radar, for example wherein the radar beam is directed at a predetermined angle $\alpha$ relative to the direction of flight of the vehicle 10.

The significance of a synthetic aperture radar system is its ability to provide a set of effectively narrow sub-beams within the illuminating scanning beam, which subbeams are defined as the synthetic beams, as illustrated by the reference numeral 17 in FIG. 1B. The synthetic beam is normally accomplished by including a reference frequency generator in the radar receiver which defines the axes of the synthetic antenna. An inertial navigation system (INS) provides a time history of the relative movement of the antenna phase center in some convenient ground coordinate system which is accurate to a small fraction of a radar wavelength for relative short periods of time, for example, the coherent integration time. The inertial navigation system provides information whereby motion compensation of the vehicle is provided. In U.S. Pat. No. 4,034,370, entitled "Second Order Motion Compensation for High Resolution Radar", issued on Jul. 5, 1977, which patent is incorporated herein by reference, there is described a method and apparatus for providing a digital implementation of dynamic motion compensation in azimuth, squinted, synthetic aperture radar by providing two stages of digital correlation utilizing discrete Fourier transform (DFT) or more preferably, fast Fourier transform (FFT) techniques. In such patent, there is described a first and second order of motion compensation which in effect causes the synthetic beams 17 to remain at fixed ground positions during the coherent integration time irrespective of aircraft maneuvers. In such system, following the first stage of correlation, the targets illuminated by the radar antenna pattern for each range gate are separated on a spectral basis in the time domain by an integrating digital filter bank, which in effect forms a plurality of synthetically generated subbeams. A unique second time translation and a phase shift is applied to each of the subbeams 17. Following such second time translation or second order motion compensation, a second and final DFT or FFT stage of correlation sequentially operates on each synthetic subbeam 17 which in effect divides each synthetic subbeam into a plurality of high resolution beam responses or azimuth cells at times referred to as synthetic sub-subbeams and illustrated at 18 in FIG. 1D representing the final motion compensated azimuth synthetic aperture high resolution data which is then applied to suitable SAR display output means.

Because of such fine resolution, or in other words, because of the relatively small ground area that each high resolution sub-subbeam response represents, the effect of range on the final output becomes paramount.

For example, as shown in FIG. 2A, an arrow 19 represents the direction of movement of the radar antenna, and the real beam 12, which is represented as conically shaped, and illuminates a particular ground area. Each of the beamwidths 12 illuminates ground areas that are separated approximately the distance travelled during one SAR coherent integration time T. Also shown on an instantaneous basis are the subbeams 17, some of which overlap one another toward the $R_{max}$ region noted by blobs 20. The subbeams 17 are magnified in FIGS. 2C and 2D, respectively, for $R_{max}$ and $R_{min}$ to illustrate the sub-subbeams 18, which constitute the final resolution of the SAR.

With appropriate motion compensation, the subbeams 17 and the sub-subbeams 18 remain fixed as the real beam 12 scans by. As apparent from FIG. 2A, block processing is rendered difficult. In that data collected during successive T seconds, gaps occur at and near $R_{min}$ and the overlaps toward $R_{max}$ cause processing of redundant data. This blocking problem is overcome with the teaching of the referenced U.S. Pat. No. 4,034,370, by utilizing two stage processing wherein the coherent integration time used to form the subbeams 17 is much shorter relative to the real beam 12 as shown in FIG. 2B so as to facilitate continuous processing. The sub-subbeams 18 (FIG. 1D) are assumed to be part of the subbeams 17 of FIGS. 1C and 1A, which have been omitted from FIGS. 1C and 1A for clarity purposes. In FIG. 2A, each of the blobs referred to at 20 represent the ground area corresponding to each of the subbeams 17 at the illustrated ranges, while blobs 21 represent the sub-subbeams 18 at maximum range $R_{max}$, and each of the blobs 22 represent the ground area for each of such beams 18 at minimum range $R_{min}$. Further, it should be noted that the ground area covered by the blobs 20 and 21 is much larger for each respective blob than the ground area of each of the blobs 20 and 22 at $R_{min}$, thus tending to create distortion, particularly for wide range swaths.

Referring to FIG. 3, a three-dimensional diagram is shown to illustrate a non-rectilinear output of a map that exhibits a wide range swath prior to the present invention. Each of the contiguous blocks B in FIG. 3 represent an area segment that corresponds to a particular synthetic sub-subbeam 18 for a particular range gate. For example, the row of blocks B referred to at 23 represent terrain areas for a number of azimuth cells or subsubbeams 18 at the minimum range $R_{min}$; and the row of blocks B referred to at 24 represent the ground areas for such azimuth cells at maximum range $R_{max}$. As apparent from FIG. 3, the actual terrain areas for the individual range cells of each azimuth cell increase in size from $R_{min}$ to $R_{max}$. This resolution scale factor varies between the maximum range and the minimum range, and the variation of overlap of the synthetic beams (FIG. 2A) results in data block asynchronism and smearing of the output representation of the terrain when high resolution is desired. The ground areas corresponding to the individual synthetic sub-subbeams 18 in azimuth regardless of range should be practically identical and there should be data block synchronism, or in other words no overlapping area during each coherent integration time T, in order to provide the proper resolution for all range cells. Referring to FIG. 4, a three dimensional map is shown illustrating a desired rectilinear output of a map that is obtained when there is a constant azimuth scale factor and data block synchronism. The individual rows of data blocks C that correspond to the rows of data blocks B of FIG. 3 are similarly numbered.

Thus, it is desirable to provide a method and system for a high resolution synthetic aperture radar that provides data block synchronism and a constant azimuth scale factor over the range swath to provide continuous synchronized output during arbitrarily long mapping runs, and prevent smearing.

SUMMARY OF THE INVENTION

Briefly, the subject invention comprises a method and apparatus for providing a digital implementation of a synthetic aperture radar having dynamic motion compensation that includes provision for data block synchronism and constant scale factor over the entire range swath by varying the sampling rate of the data in azimuth as a function of range.

More specifically, the present invention relates to a method and apparatus for providing a digital implementation of dynamic motion compensation in a synthetic aperture radar that provides two stages of digital correlation utilizing DFT, or more preferably FFT techniques. First order motion compensation apparatus controls the sampling intervals, such that the average relative target movement at each range gate is tracked during the required observation time; and an RF phase shift, associated with the instantaneous two-way change in line of sight distance to each range gate or cell, is applied such that all phase shift is cancelled along the locus of the intersection of the azimuth boresight with the assumed ground surface. Thus, after the first order motion compensation is applied, the stationary ground targets lined along the azimuth boresight exhibit zero doppler frequency, whereas targets away from the azimuth boresight will exhibit a doppler frequency which is proportional to the azimuth separation distance. Such digital data samples, which are then stored in a high speed buffer memory in real time, are fed out at a lower constant rate making use of the full interpulse period of the radar. The azimuth sampling of the digital data is then varied as a function of range; that is, as each range cell approaches maximum range, the sampling rate is decreased. Such samples, which are then fed to an integrating digital filter bank configured preferably as on FFT algorithm, may be coupled to a range interpolator and complex multiplier for application to a high speed buffer, thus providing the integrating function for the first stage of correlation. The targets thus illuminated by the radar antenna pattern in each range gate are separated on a spectral basis in the time domain by the integrating digital filter bank, which in effect forms a plurality of synthetically generated subbeams to each of which a unique second time translation and phase shift is applied. Also, the targets thus illuminated provide a different sampling rate in each range gate to provide synchronism and constant scale factor that is independent of range for the said second time translation and phase shift. Following this second order of motion compensation or time translation and phase shift, a second and final FFT stage of correlation sequentially operates on each synthetic subbeam, which in effect, divides each synthetic subbeam into a plurality of high resolution beam responses or azimuth cells (sub-subbeams) representing the final synthetic aperture resolution data which are then applied to suitable SAR display output means.

BRIEF DESCRIPTION OF THE DRAWINGS

FIGS. 2A, 2B, 2C and 2D are diagrams illustrating ground area covered by individual subbeams and sub-subbeams at different ranges at two aircraft positions along the flight path 19. The variation of overlapping areas common to adjacent synthetic beams more clearly illustrate the problems associated with high resolution radar;

FIG. 12 is a block diagram of the keystone interpolator of FIG. 5;

FIG. 14 is a graph to illustrate the resampling times at various ranges; and

FIGS. 15A and 15B graphically illustrate the resampling to compensate for tangential velocity.

DESCRIPTION OF THE PREFERRED EMBODIMENT

Figure 5:
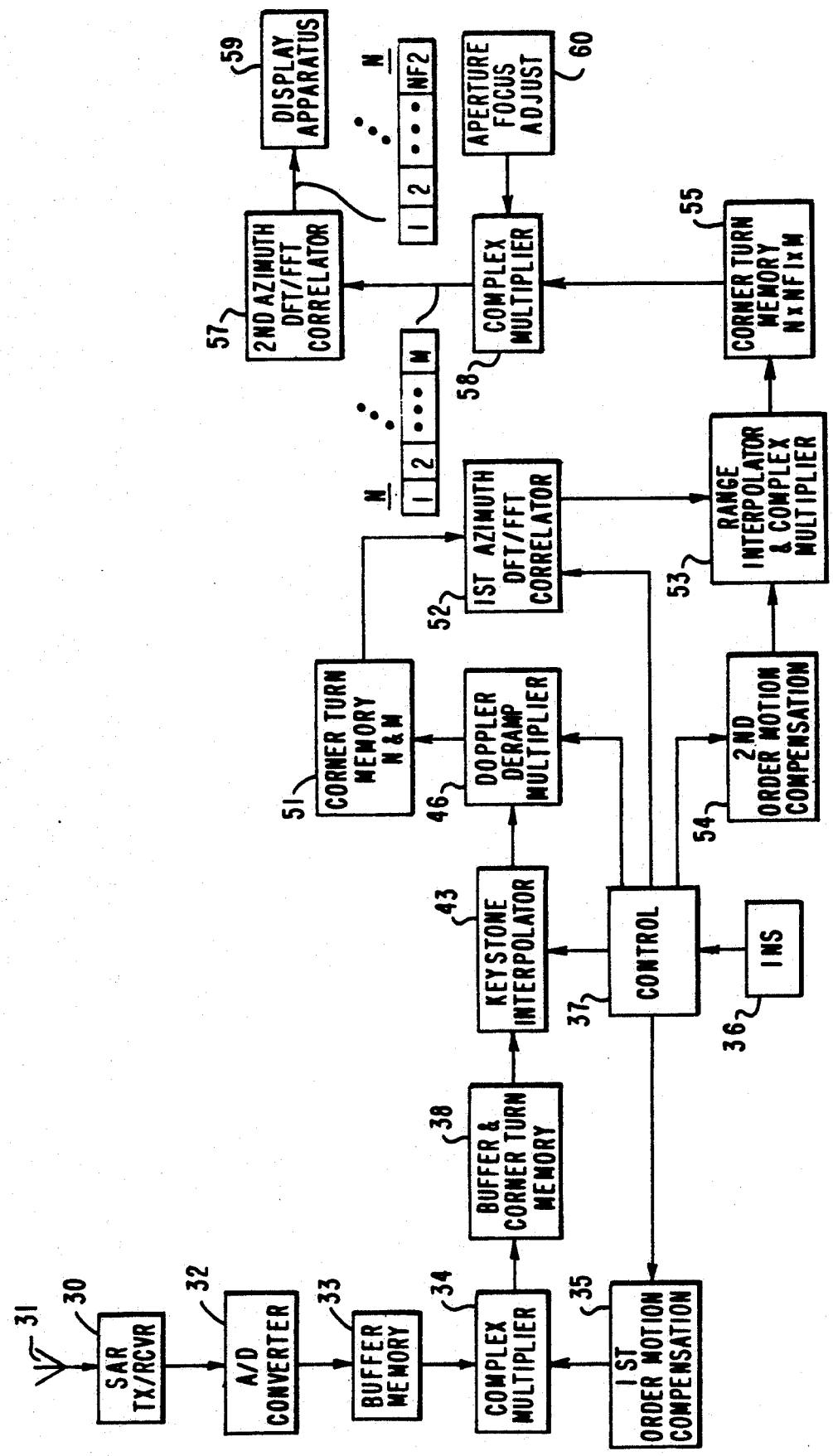
FIG. 5 is a functional block diagram of the preferred embodiment of the present invention.

Referring to FIG. 5, there is shown in block diagrammatic form, a digital implementation of the preferred embodiment for performing the synchronism and rectilinear formatting of the data blocks in connection with a system that includes second order motion compensation disclosed in the U.S. Pat. No. 4,034,370 incorporated herein. A synthetic aperture radar transmitter/receiver 30 is coupled to a suitable antenna assembly 31; and assuming consecutive pulses are transmitted and received, the complex video signals from each radar return is consecutively fed to an analog-to-digital converter 32 which may, when desirable, take the form of a time multiplexer configuration that includes sample and hold circuits that feed into respective analog-to-digital converter stages as described in connection with the referenced patent, so as to reduce the data rate for each circuit by a certain factor. The sample and hold as well as the analog-to-digital converter stages of the converter 32 couple into a high speed buffer memory 33 which then operates to sequentially feed out N complex data samples corresponding to N range cells for each pulse or azimuth time segment. N is equal to the number of range cell samples, NF1 is the number of filters or subbeams from correlator 52, and M is the number of time samples produced by each subbeam filter. As the N complex data samples are fed out of the buffer memory 33, they are fed to a complex multiplier circuit 34 whereupon each data sample has a phase shift applied thereto which is also required for the first order motion compensation as follows:

$$\phi = 4\pi \Delta(x,y,z)/\lambda$$

where $\Delta R(x,y,z)$ is the line of sight deviation as a function of motion, and $\lambda$ is the wavelength. The first order motion compensation function 35 is coupled to and receives suitable data from a conventional inertial navigation system 36 through a control function 37.

Coupled to the complex multiplier circuit 34 is a buffer and corner turn memory circuit 38 which stores L sets of N complex data samples during the subbeam filter coherent integration time T1. The memory 38, which may be, for example, comprised of a magnetic core matrix or preferably semiconductor memory performs a "corner turn" operation wherein the data is entered in by columns index L, and read out by rows, index N1 so that such data is read out for each set of N1 samples for each range N in sequence. Successive sets of N1 samples at each range N must be overlapped to prevent subbeam aliasing. The memory 38, when desirable, may be double buffered so that the data being read out does not interfere with the data being read in.

Figure 3:
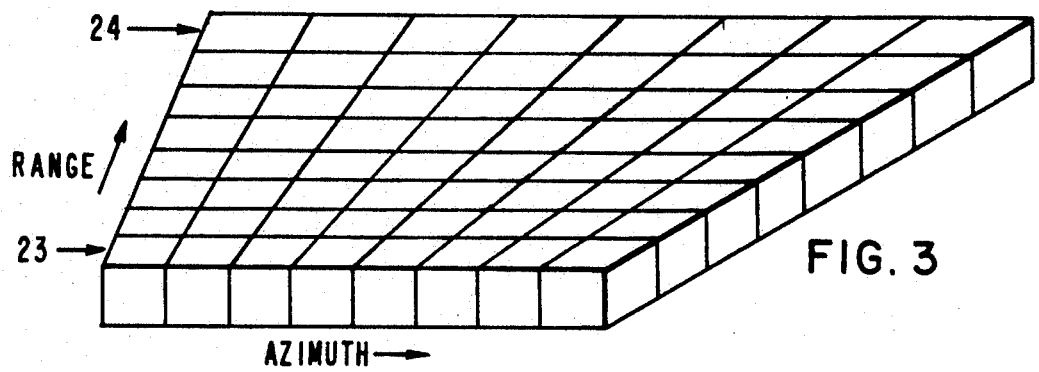
FIG. 3 is a diagram illustrating the segmentation of the range swath and azimuth cells to illustrate the non-rectilinear output of a high resolution system without the benefit of the present invention.
Figure 6:
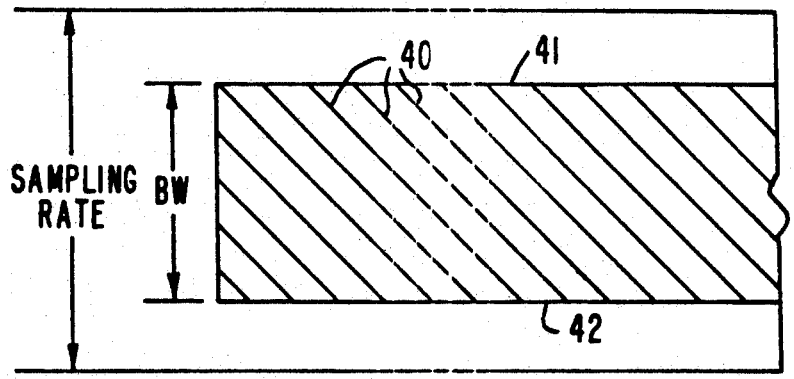
FIG. 6 is a time frequency diagram illustrating the change of doppler at the output of the analog-todigital converter of FIG. 5.

In reviewing the system up to the present point in the discussion, it should be pointed out that for a high resolution wide range swath, that the scale factor; that is, the number of feet in azimuth on the ground that is represented by each subbeam sample corresponds to the illustration of FIG. 3 where the row of blocks B in azimuth 24 for the far range $R_{max}$ has a much larger scale factor than the blocks B for row 23 that is at minimum $R_{min}$ range. Naturally the intervening ranges of FIG. 3 have correspondingly larger areas for each of the samples. Also, the time-frequency, doppler format of the input signal to the buffer memory 33 is illustrated in FIG. 6, wherein each one of the slant lines 40 represents a doppler shift in frequency from upper end 41 to lower end 42 as a target area moves from the leading edge to the trailing edge of the beam 12 at a particular range. The slope of the lines 40 increases and becomes shorter in time as the range decreases but the doppler spread BW (from 41 to 42) remains constant.

Figure 7:
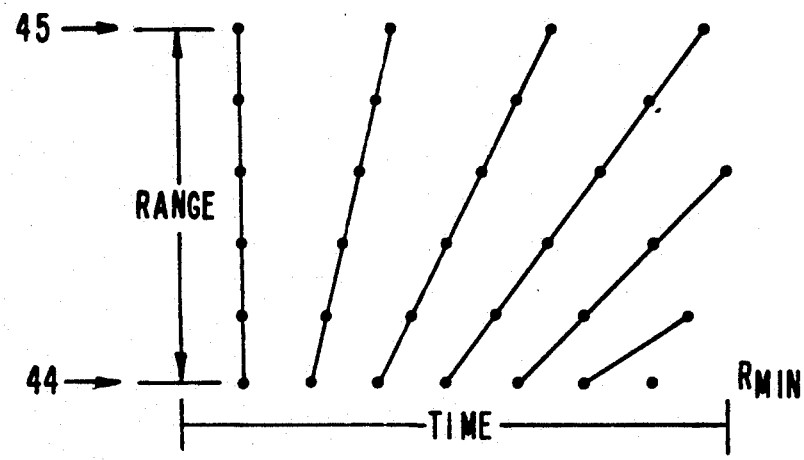
FIG. 7 is a general pictorial illustration to show the decreased sampling rate as a function of range which is performed by the keystone interpolator of FIG. 12.

To overcome the problems of data asynchronism, variable doppler slopes, and azimuth scale factor of the processed output at 59 as a function of range when a wide range swath is mapped, the output from the buffer memory 38 is fed to what may be termed a keystone interpolator 43 which resamples the L azimuth data such that the azimuth sampling rate varies inversely with range. The term keystone is utilized herein because the ever increasing scale factor in azimuth as a function of range provides a keystone configuration of the output of the system as illustrated in FIG. 3. As illustrated in FIG. 7, the samples at the output of the interpolator 43 for the range cell $R_{min}$, referred to at row 44, are greater in number and occur at a greater rate than the samples at the $R_{max}$ referred to at row 45. The intermediate range cells represented by the rows between rows 44 and 45 are correspondingly more in number and occur at a slower rate. The operation of the keystone interpolator 43 will be given in more detail for an exemplary situation in connection with the description of FIG. 13. The keystone resampling interpolator 43 also provides the proper doppler format to deramping multiplier 46 which eliminates the change of doppler for a target area from the leading to the trailing edge of the beam represented in FIG. 6. As shown by the time-frequency diagram of FIG. 8, in contrast to the diagram of FIG. 6, the horizontal lines such as 47 represent a constant doppler for a target area, in either spotlight or scanning modes. Such area moves in azimuth from the leading to trailing edge of the beam as shown by lines 48 and 50 respectively. The constant doppler as represented by lines 47 for each small ground sample or area is different, and is either leading or lagging in accordance with its azimuth position. The deramping multiplier 46 is merely an apparatus that eliminates the change in doppler frequency of each individual target sample 47 as it moves from the leading to the trailing edge of the beam.

Figure 9:
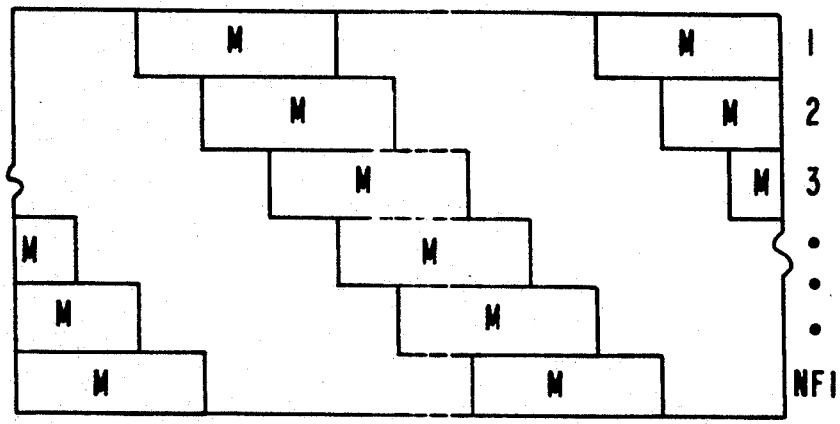
FIG. 9 is a diagram to illustrate the ground segments in azimuth and range corresponding to the processed signals at the output of the first azimuth DFT/FFT correlator of FIG. 5.
Figure 10:
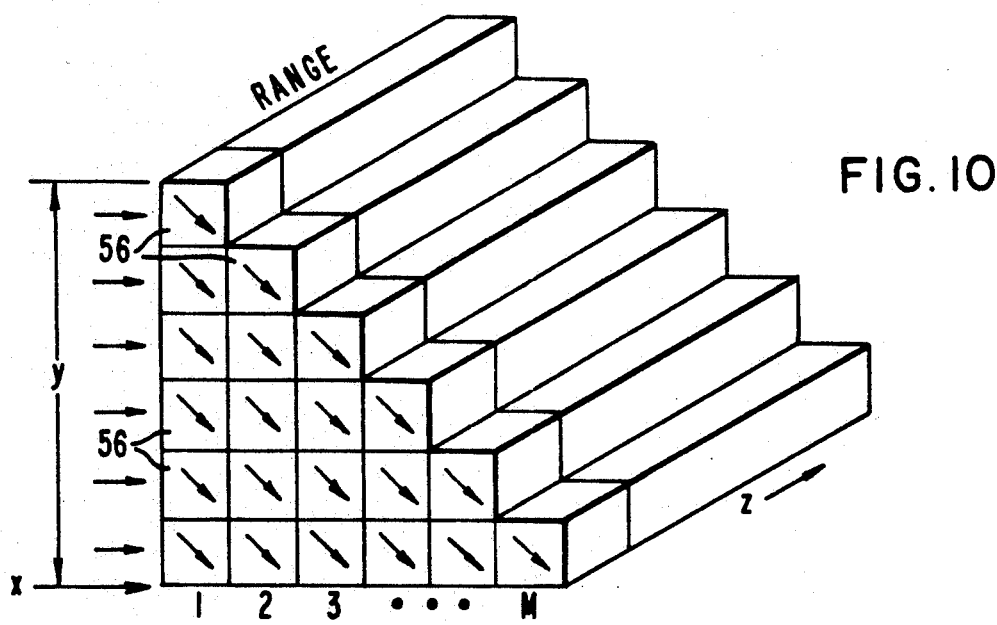
FIG. 10 is a diagram illustrating the principles of a buffer memory which may be utilized with the present invention.

A corner turn memory 51, which is similar to the corner turn memory 38, is provided to provide M signal samples for each range cell, whereas the previous buffer memory 38 provides L samples for each range cell. A first digital correlator 52 is coupled to the corner turn memory 51 to perform a correlation integration function, and as such, acts as a digital filter bank. The correlator 52 comprises apparatus preferably configured to perform the FFT algorithm. Such apparatus functions in the same manner as described in the referenced U.S. patent. One type of apparatus which may be utilized is disclosed, for example, in U.S. Patent Application Ser. No. 269,362, filed in the name of the present inventor on Jul. 6, 1972, which is a continuation of U.S. Patent Application Ser. No. 151,441, filed Jun. 9, 1971, both applications now being abandoned. Thus, the first correlation filter bank 52 in the form of a DFT or FFT processor is coupled to a corner turn memory 51 whereupon a repeated sequence of azimuth samples are processed for each range for each subbeam integration time T1. The correlator 52 effects a time frequency discrimination which, in effect, resolves the samples in azimuth into frequency bands (see FIG. 9) which correspond to a plurality of synthetic subbeams such as 17 (FIG. 2b, for example) in azimuth within the real beam 12. An output sequence of M samples from each synthetic subbeam for each sub-subbeam 18 coherent integration time provided by the correlator 52 is shown in FIG. 9. These subbeam responses are actually time samples which are sequentially fed to a range interpolator and complex multiplier 53 which effects a second order motion compensation time translation and RF phase shift, respectively, to each synthetic subbeam time sample. The required time and RF phase shift is determined from data fed to a second order motion compensation function 54, which is also driven by the inertial navigational system 36 through the control 37. Each of the data corresponding to synthetic subbeams 17 from the range interpolator and complex multiplier 53 are fed into a corner turn buffer memory 55 which may be, for example, configured as shown in FIG. 10, wherein each block 56 represents storage means for a complex datum word consisting of several binary bits. The memory 55 permits continuous operation with half of the memory required by a conventional block; that is, each Nx NF1 data block is entered from the left on the X axis. A data block comprised of M×N samples is removed along the Z axis as shown, and fed to correlator 57 while all other blocks are shifted to the right and down by one data block. Data is fed out first in the direction of the Z axis, and then in the direction of the y axis downward to a complex multiplier circuit 58 to which an aperture focus adjustment section 60 applies a minor correction, when desirable. The correlator 57 delivers the M×NF2 data blocks representing a further superposition of each of the sub-subbeams 18 (FIG. 2A) in the azimuth direction and being fully resolved for output at 59 to the usual display and/or recorder or synthetic aperture radar mapping apparatus.

Figure 8:
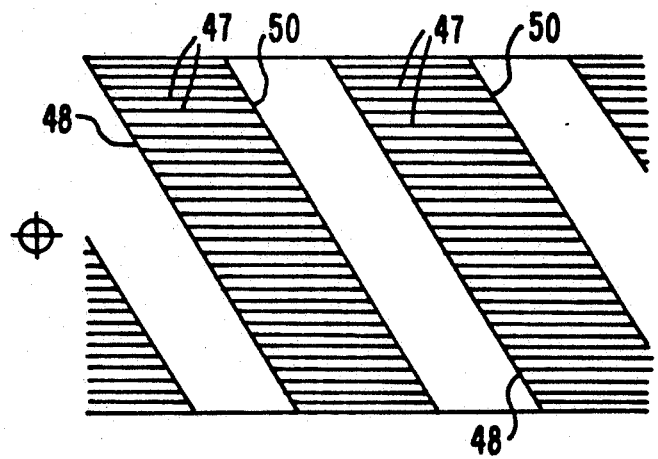
FIG. 8 is a spectral diagram to show the constant doppler at each side of a center or locus which is created by the doppler deramping multiplier of FIG. 5.

The control 37 may be conventional apparatus that operates to read out each range cell of the keystone interpolator 43; and cancels the doppler of the first order motion compensator 35; and also supplies to the function 46 the particular FM slope to deramp each of the target samples so that they will stay in one particular filter in accordance with FIG. 8. In the squint mode, for example, the control 37 supplies information to the first and second order motion compensation 35 and 54 to keep track of the pointing of the antenna 31. Such control 37 also provides necessary synchronization, such as, to the correlator 52.

Figure 4:
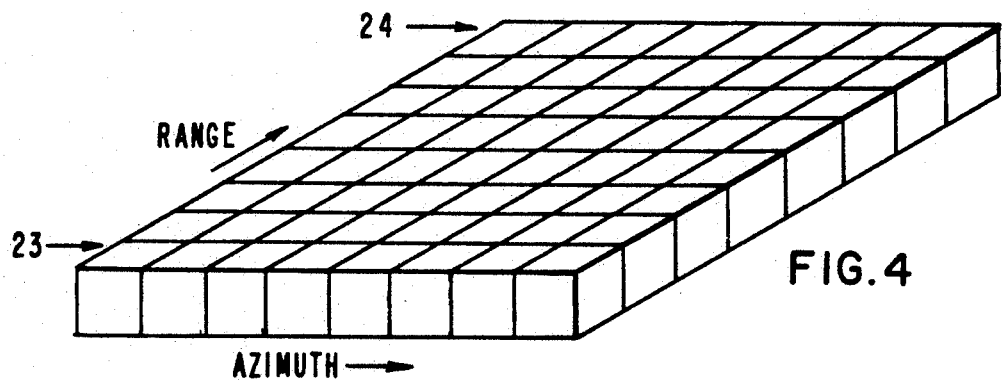
FIG. 4 is a diagram illustrating the segmentation of the range swath and azimuth cells with the benefit of the method and system of the present invention.

In accordance with the method and apparatus of the present invention, the keystone interpolator 43 which is an azimuth interpolator-prefilter, resamples the azimuth data such that the sampling rate varies inversely with range; that is, the sampling rate decreases as the range increases. This arrangement provides a constant azimuth scale factor, providing the results as shown in FIG. 4, as contrasted to the previously described FIG. 3, and provides data block synchronism over the entire range swath at the expense of a slight increase in the azimuth FFT arithmetic rate. The speed of the azimuth FFT correlator 57 is independent of range and is exactly synchronous among all range cells. The keystone interpolator 43 provides the proper doppler format to the deramp multiplier 46 such that memory blocks to the second stage FFT operate in synchronism with equal azimuth scale factor as a function of range (see FIG. 7).

The keystone interpolator 43 may be a well-known apparatus that samples in azimuth. For example, and referring to FIG. 12, the interpolator 43 includes a plurality of shift registers 65 through 69 for delaying the samples, such that there is time coincidence at the output to the deramp multiplier 46. Although a pipeline diagram of the delay and interpolation function having shift registers 65 through 69 is illustrated to provide clarity in understanding the present invention, a preferred implementation would involve a programmable type structure to perform the same function. The azimuth samples, typically six, are applied to the delay devices 65 through 69 to store a line of samples from buffer 38 for each range cell of the system. Each of the samples 1A through 6A are weighted at the outputs of their respective registers along with the current sample 1A that is weighted but undelayed. Such weighting is shown schematically to occur at respective multiplying devices 70 through 75 to which may be applied weights $\omega_1$ through $\omega_6$ respectively. The weighted samples are summed at summing devices 76 through 80 inclusive to provide the resultant interpolated output to the deramp multiplier 46. One of a number of interpolator weight sets, typically ten, are selected by the controller 37, which most closely correspond to the desired azimuth resampling time of each range cell. The ten weights provide ten equally spaced interpolation times between the interpulse period or azimuth sampling ratio at the input to the keystone interpolator 43 from memory 38. The control 37 also determines the starting azimuth samples at 6A and may require more or less than one output for each input in accordance with the required resampling rate as a function of range.

The particular applied weight sets may be readily ascertained by reference to equation 4 on page 20 of an article entitled "Linear Interpolation Extrapolation and Prediction of Random Spaced Time Fields with a Limited Domain of Measurement" by D. P. Peterson published in the Transactions on Information Theory of the IEEE in January of 1965, which is incorporated herein. In such equation, the weights would be obtained by solving G therein.

At the complex multiplier 34, the first stage of motion compensation 35 applies a doppler phase shift to the data as a function of range, such that the instantaneous doppler FM slope to points along the moving ground reference line are zero. This motion compensation includes the effect of aircraft perturbations, and maneuvers as well as the geometry of the terrain. Signal sampling time variations due to the perturbation of line of sight distance are normally compensated by appropriate changes in the A/D timing at the beginning of each interpulse period as determined by the first order motion compensation 35. Alternatively, signal sampling time variation can be made by a range interpolator such as 53. The resulting doppler format was described in connection with FIG. 8.

Figure 11:
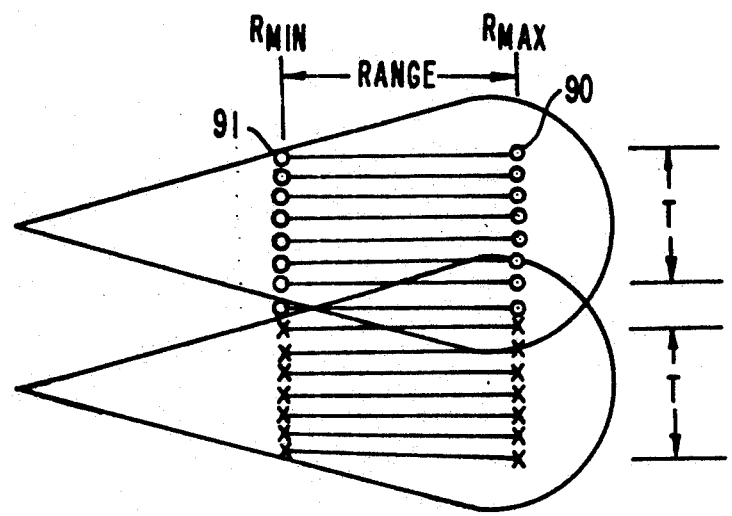
FIG. 11 is a diagram similar to FIG. 2A illustrating synchronism and rectilinear format obtained in accordance with the present invention.

The first azimuth FFT correlator 52 produces time history signal samples from doppler subbeams which track fixed areas on the ground. M samples are selected from each of these synthetic subbeams during the main beam illumination as illustrated by the rectangles M of FIG. 9. Whereas the keystone interpolator 43 can correct for tangential accelerations, the first and second stages of motion compensation correct for radial acceleration. The second stage of motion compensation 54 may also be a convenient point to compensate for range curvature, that is, range cell crossing during the dwell time. It should be noted, that with a modest degree of maneuvers and resolution cell size, the requirement for any correction at this point may be marginal in which case the interpolator function of the second order of motion compensation may be eliminated. As shown in FIG. 10, the bulk storage required at any given time is approximately triangularly shaped in the azimuth subbeam by dwell time plane. Data is loaded into the left wall of the triangle memory of FIG. 10, that is, subbeam samples for all ranges. The data in the uppermost "step" contains the first data samples received from the forwardmost subbeam initially being illuminated by the antenna pattern. The data then "walks down the stairs". The data accumulated from the rearmost subbeam at the base of the triangle memory of FIG. 10 is then read out to the second azimuth FFT correlator 57 for each range cell. Thus, the controlling parameter which determines the readout time of the second stage azimuth FFT 57 is independent of range as will be more specifically described in connection with the operation. The released memory from the corner turn memory 55 is then reassigned to the next subbeam data block and the process continues. The output of the FFT correlator 57 occurs in synchronism across the range with a constant scale factor. The range swath may be segmented into small blocks with separate azimuth resampling by the keystone interpolator 43 applied to each block, or a separate azimuth resampling rate may be applied at each range cell. Referring to FIG. 11, as contrasted to FIG. 2, the blobs 90 at maximum range have the same resolution as the blobs 91 at minimum range, thus providing a constant scale factor. The blobs 90 and 91, as a result are aligned in their respective synthetic beams without the overlap as shown in FIGS. 2A and 2B. Thus there is effected synchronous data blocks to provide a rectilinear mapping data format for each of the synthetic beams.

In describing the method and apparatus of the present invention in accordance with a particular parametric operation example, reference will be made to the various figures as well as FIGS. 13A, 13B, 13C, and 13D. In the present example the following parameters are assumed. The maximum slant range $R_O$ equals 100,000 feet. The wavelength $\lambda$ equals one-tenth of a foot, while the azimuth resolution $\gamma_a$ equals 5 feet. The azimuth angle $\phi$ equals 90° and the velocity of the radar platform is 1,000 feet per second.

Further, the basic parametric relationships of the example are as follows:

$$T_o = \frac{R\lambda}{2\gamma_a V \sin\phi} = 1.0 \text{ sec (coherent integration time)}$$

$$\dot{f}_{do} = \frac{2V^2\sin\phi^2}{R\lambda} = 200 \text{ Hz/sec (doppler FM slope)}$$

$$\Delta fd = \frac{V}{\gamma_a} = 200 \text{ Hz (required doppler bandwidth)}$$

$$F_{s_o} = \Delta fd = 200 \text{ Hz (azimuth resample rate*)}$$

*zero sampling redundancy at maximum range for convenience of discussion.

The subscript, o, refers to maximum range parameters, while the subscript, 1, refers to 9/10 of the maximum range, and the subscript, 2, refers to ½ the maximum range. The resampling rate $F_s$ varies inversely with range. For example, at 9/10 of the maximum range, the sampling rate is 1.111 of the sampling rate of the maximum range, as expressed by the following equation:

$$F_{s1} = F_{so} \cdot \frac{R_o}{R_1} = 1.111 F_{so}$$

Also, the first derivation of doppler frequency at 9/10 the range equals 222.2 Hz/sec. where the first derivation of doppler frequency at the maximum range is 200 Hz/sec., as expressed by the following equation:

$$\dot{f}_{d1} = \dot{f}_{do} \cdot \frac{R_o}{R_1} = 222.2 \text{ Hz/sec.}$$

Further, the coherent integration time is equal to 0.9 seconds in accordance with the following equation:

$$T_1 = T_o \cdot \frac{R_1}{R_o} = .9 \text{ sec.}$$

Therefore, the doppler deramp multiplier 46 which is illustrated in FIG. 5 has an FM slope of 200 Hz/sec. at maximum range $R_o$ and 222.2 Hz/sec. at 0.9 $R_O$. It is assumed that the first stage azimuth FFT 52 produces 10 filters or subbeams that are equally spaced over the azimuth resample rate $F_s(R)$.

Figure 13A:
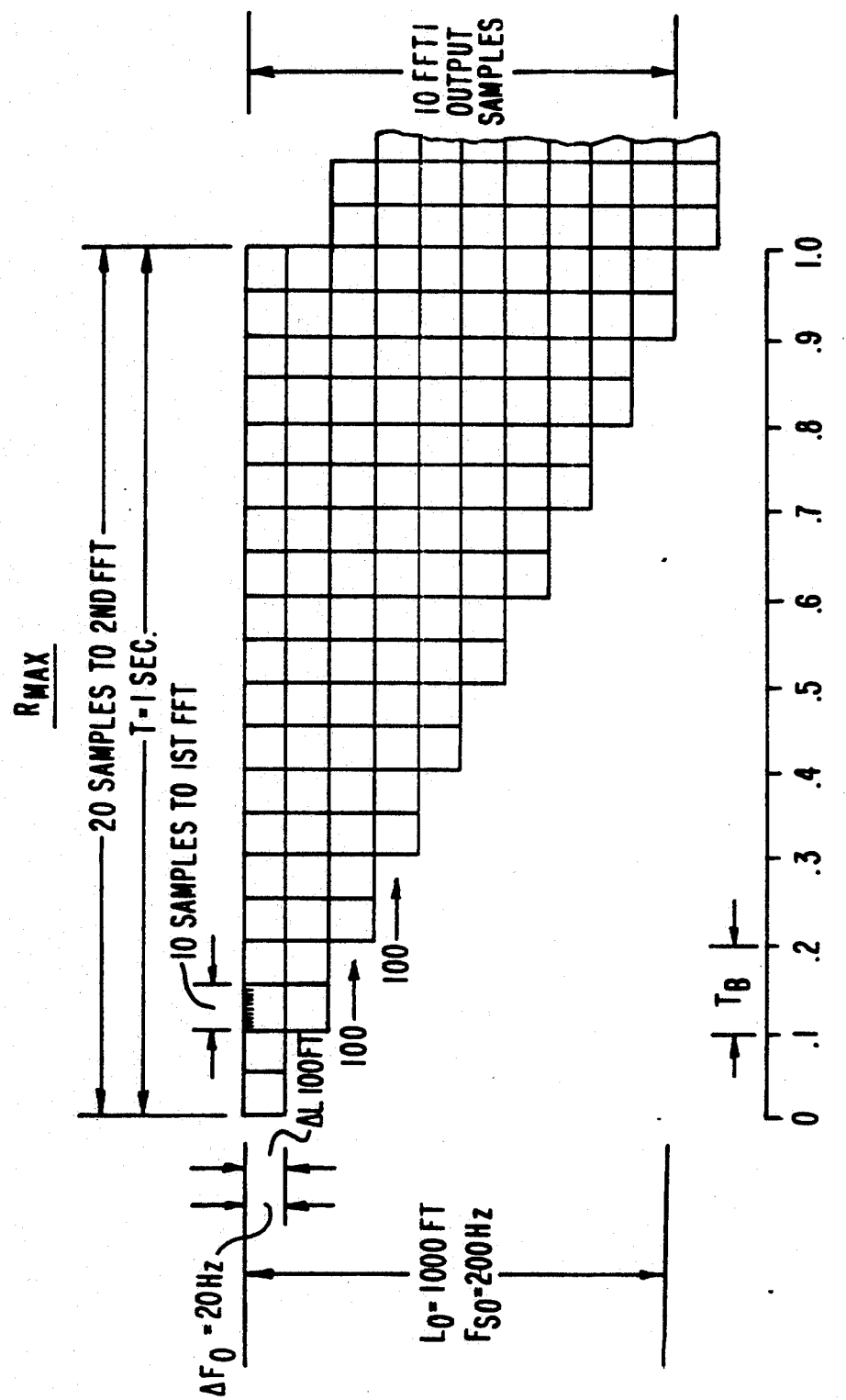
FIGS. 13A, 13B, 13C, and 13D are diagrams to illustrate the operation and implementation according to a parametric example of the present invention.
Figure 13B:
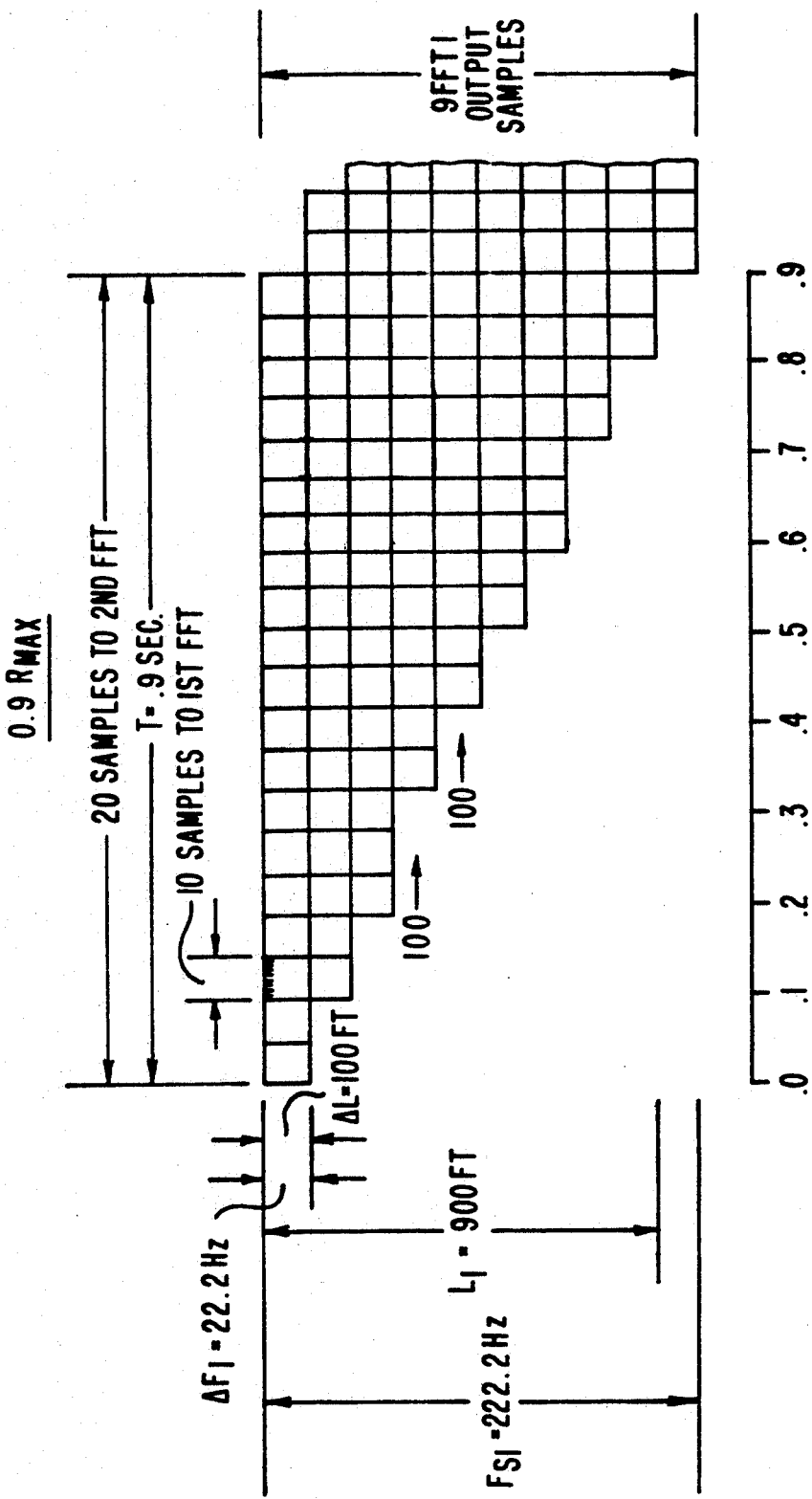

Referring to FIGS. 13A, B, C, and D the time frequency diagram of FIG. 9 at the output of the first FFT correlator 52 is shown in greater detail for maximum range, 0.9 maximum range, and 0.5 maximum range. The skewed rows of data blocks 100 represent the first stage FFT 52 outputs for each 100' of azimuth swath. It is further noted that 10 inputs to the first stage FFT correlator 52 produce exactly 10 filters or subbeams which are equally spaced in frequency over their respective sample rate $FS_0$, $FS_1$, and $FS_2$; therefore, the subbeam filter bandwidths vary with range as follows:

$$\Delta F_0 = \frac{F_{so}}{10} = 20 \text{ Hz}, \Delta F_1 = 22.22 \text{ Hz}, \Delta F_2 = 40 \text{ Hz}.$$

It is understood that good engineering practice demands that more than 10 inputs are required to the first stage FFT correlator 52 to provide sufficient sampling redundancy for the prevention of alias responses. This results in overlapping data inputs to 52 since the outputs are required for each 10 inputs in this example. The distance represented in azimuth along the ground by each subbeam is $$\Delta L_o = \Delta F_o V/\dot{f}_{do} = \frac{20(1000)}{200} = 100'$$

$$\Delta L_1 = \Delta F_1 V/\dot{f}_{d1} = \frac{22.22(1000)}{222.2} = 100'$$

$$\Delta L_2 = \Delta F_2 V/\dot{f}_{d2} = \frac{40(1000)}{400} = 100'$$

The above demonstrates that the distance or azimuth scale factor associated with each azimuth subbeam is range independent. Thus, it is only necessary to accumulate data samples from each azimuth subbeam represented by one of the rows of data blocks 100 for a time duration equal to the coherent integration time as a function of range; and since the azimuth scale factors of these outputs are equal, the number of samples, the size of the second stage FFT 57, and the timing of the FFT 57 are all independent of range. The following is set forth to verify such range independence.

$NFFT2_0 = \Delta F_o T_o = 20(1) = 20$ samples at $R_o$.

$NFFT2_1 = \Delta F_1 T_1 = 22.22(0.9) = 20$ samples at $R_1$ $NFFT2_2 = \Delta F_2 T_2 = 40(0.5) = 20$ samples at $R_2$ In accordance with the present invention, the second stage data block timing or the second stage FFT 57 is derived from the frequency of the reference of the deramping mechanism 46 as controlled by the common control apparatus 37 as previously mentioned. A subbeam data block (row 100) is delivered to the FFT 57 each time a subbeam filter spacing is crossed by the deramp reference or each time the radar platform (in the strip mapping mode) moves 100 feet. This is illustrated by the following equations:

$$T_{B_0} = \Delta F_0/f_{d_0} = \frac{20}{200} = 0.1 \text{ sec.}$$

$$T_{B_1} = \Delta F_1/f_{d_1} = \frac{22.22}{222.2} = 0.1 \text{ sec.}$$

$$T_{B_2} = \Delta F_2/f_{d_2} = \frac{40}{400} = 0.1 \text{ sec.}$$

Figure 13C:
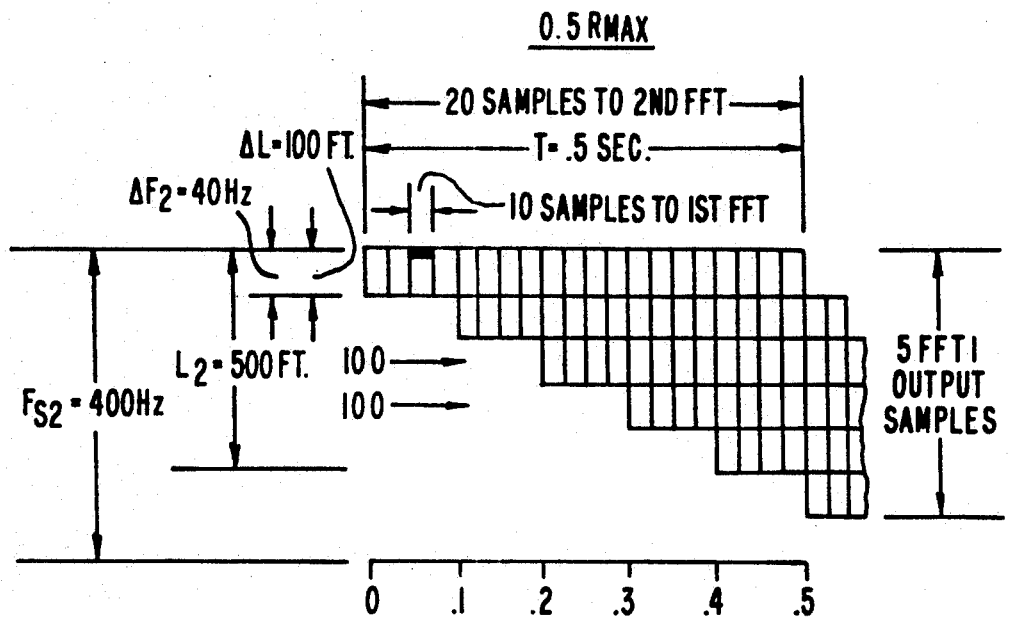
Figure 13D:
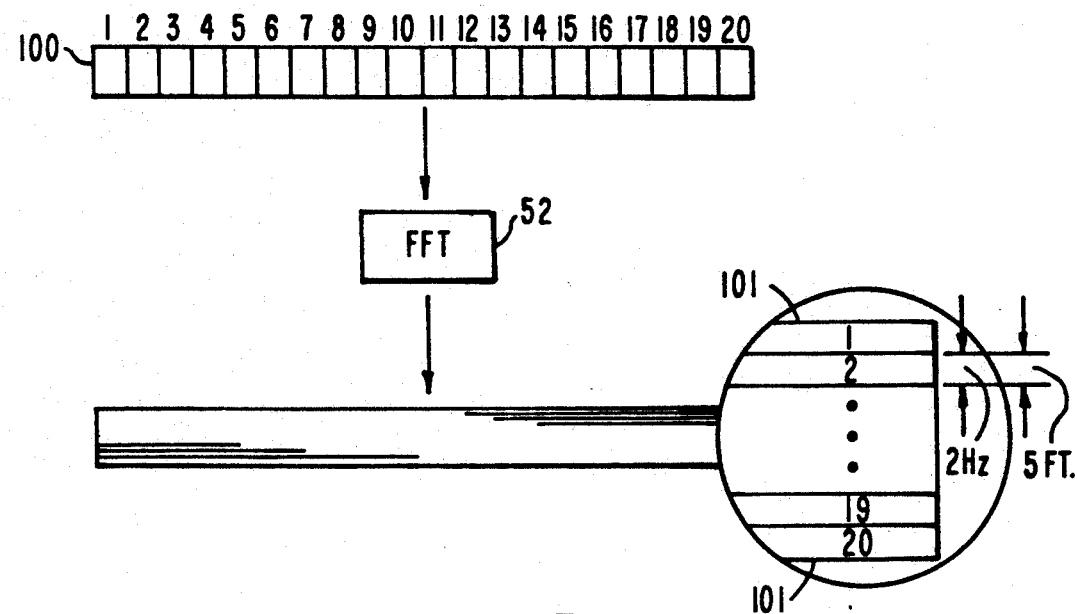

Each of the second FFT 57 outputs produces 20 resolution cells as shown in FIG. 13D by the individual filter responses from a respective row 100 FIGS. 13A, B and C over the 100 feet in azimuth or in other words provides a 5 foot resolution. The data blocks 100 corresponding to the subbeams are applied to the correlator 57; and the sub-subbeam data 101 is obtained from the output of the correlator 57 and applied at the output 59 for utilization. Thus, the scale factor and data synchronization are consistent over range.

Note in the time frequency diagram 13A, one subbeam data block is dumped to the complex multiplier 58 at a rate of exactly that of the subbeam sampling rate in one of every two subbeam samples. At 0.9 maximum range (13B), only nine subbeams 100 in azimuth are chosen and there are slightly more than two subbeam samples per data block dump. This is noted in FIG. 13B by the two jumps of three samples. At half range only five subbeams or rows 100 are selected, and a subbeam data block dump occurs once for each four subbeam data samples as shown in FIG. 13C. Thus, the memory requirement is one-half at one-half range and the size of the first stage FFT 52 can be cut in half.

In accordance with the present invention, the azimuth resampling function performed by the keystone interpolator 43 also may be applied independently to each range cell as well as to predetermined blocks of range cells. To accomplish such continuous resampling, the following algorithm serves to maintain data index synchronization for indefinitely long periods of time for each range sampling. For convenience, the sampling parameters are normalized at near range which is denoted by the subscript o. The range sample or cell index is k and the observation time index is t in units of interpulse periods T. The desired $j^{th}$ resample time for the $k^{th}$ range cell is $$t_{k,j} = j\frac{(R_o + kr_s)T_o}{R_oT} \qquad (1)$$

where:
  $R_o$ is minimum range
  $r_s$ is range sampling distance
  $T_o$ is desired sampling period at $R_O$
let:
  $T_o = T$ $$q = \frac{r_s}{R_o}$$

$$t_{k,j} = j(1+kq) = [j(1+kq)]_I + (j(1+kq))_F \qquad (2)$$

where $[\cdot]_I$ and $\{\cdot\}_F$ are the integer and fractional parts respectively.

The integer part of equation (2) addresses the signal data samples while the fractional portion addresses the appropriate interpolator weight set of the filter 43. This function is easily implemented with binary counters by choosing clock rate parameters to be power of 2 multiples of T. The size of the FFT 52 is unchanged within a 2:1 range ratio causing the subbeam outputs thereof to occur at a constant submultiple of the azimuth rate at each range cell. Therefore, the subbeam sample rate and the normalized index of these synthetic subaperture periods also vary inversely with range. Although not necessary, it is convenient to mechanize the above equations (1) and (2) with a rational relationship between the range sample time and the block time $T_B$ (see FIGS. 13A through 13C) of the FFT 57 such as t1=1/2q=81 where q=1/16 in equation (2). The values of $t_{k,j}$ are plotted in FIG. 14 for the present example. It is necessary to find the value of j as a function of k versus t, and in particular at the beginning of a particular integration time t=L/2q.

$$j=f_{(k)} \text{ at } t1=L \qquad (3)$$

Substituting (2) into 1 yields $$1 = j(1 \rightleftharpoons kq)q \qquad (4)$$

Then solving for the integer j gives the formulation of (2) which also holds for subbeam output samples. In some organizations of a programmable processor, it is desirable to determine the indices of j in a given $l^{th}$ subbeam data block as a function of k and then determine the sample time. Taking the time between subbeam blocks to be $T_B$ as before, the time of the $l^{th}$ block is $$t_l = \Delta T_B \qquad (3.5)$$

equating with eq (2) yields $$T_B = j(1+kq) \qquad (3.6)$$

Solving for the integer, j, gives the block ending and block beginning values of j respectively $$j = \left[\frac{lT_B}{1+kq}\right]_I \text{ (ending)} \qquad (5)a$$

$$j = 1 + \left[\frac{lT_B}{1+kq}\right]_I \text{ (beginning of next block)} \qquad (5)b$$

Given the starting j for each k we can solve for the interpolation time $t_k$, $$t_{k1} = j(1 + kq) = 1 + \left[\frac{lT_B}{1 + kq}\right]_I (1 + kg) \quad (6)$$

The problem of the time index growing indefinitely large is easily solved by the following theorem of modulo arithmetic which limits the time word size to N.

let $U = X \cdot Y$ then $MOD(U,N) = MOD(V,N)$ (7)

where $V = MOD(X,N) \cdot MOD(Y,N)$
yields $$MOD(t_{k,}; N) = MOD\left(1 + \left[\frac{lT_B}{1 + kq}\right]_I; N\right) \quad (8)$$

$$= \frac{MOD(1 + kq, N)}{MOD\left(1 + \left[\frac{lT_B}{1 + kq}\right]_I; N\right)}$$

$$(1 + kq)$$

Example values of $t_{k,l}$ are plotted along constant j lines in FIG. 14. The first block of data is input to the 2nd stage azimuth FFT at $l=1$. Note that this occurs at $t=8$ for all k. The fact that the time phasing of these points vary with k is of little consequence.

Figure 1A:
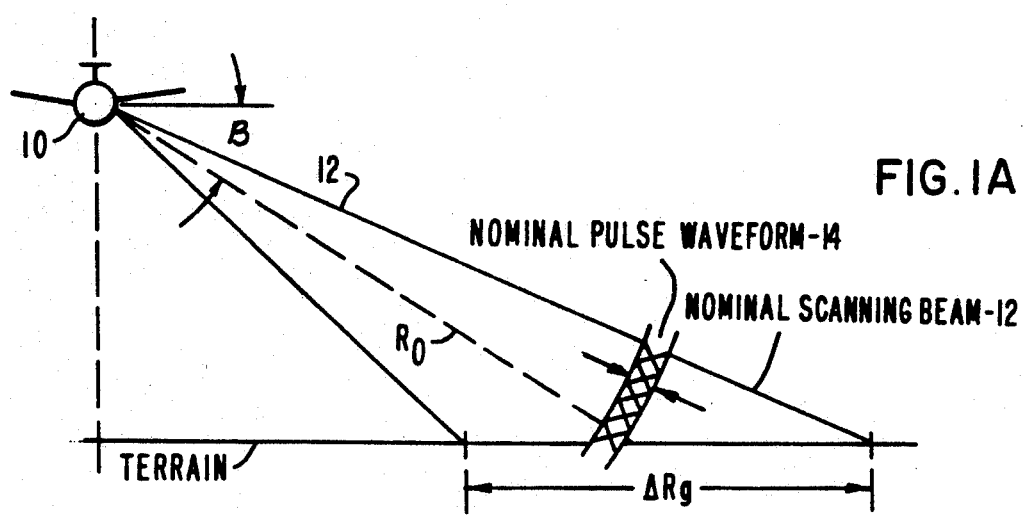
FIGS. 1A, 1B, 1C and 1D are elevation and plan views respectively of the geometry of an airborne synthetic aperture radar system, illustrating fragmentarily the synthetic subbeams, and sub-subbeams of the described method and system.
Figure 1B:
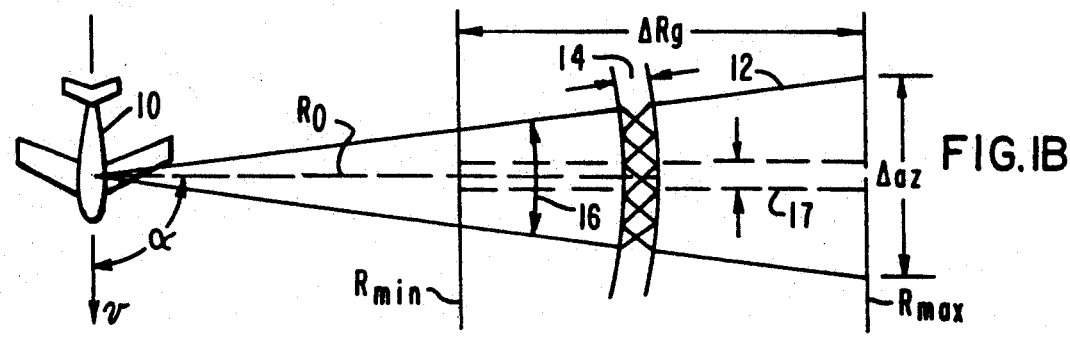
Figure 1C:
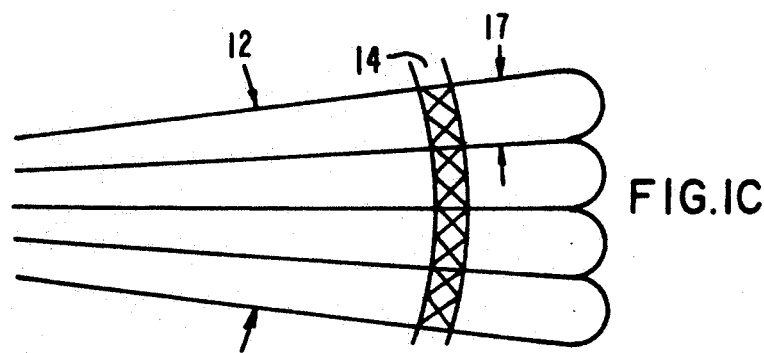
Figure 1D:
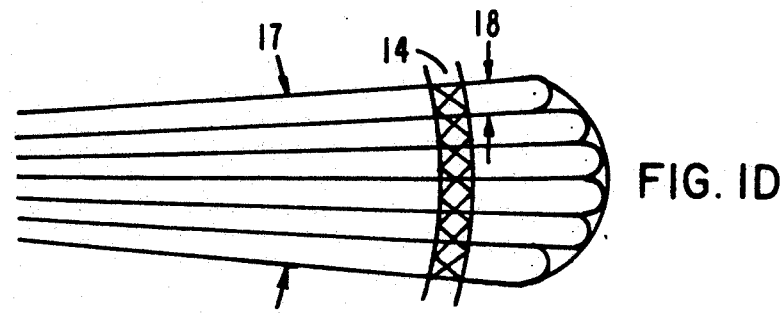

The arrangement shown in FIG. 5 is utilized for the squint mode, strip mapping and scanning of synthetic aperture radar. Referring again to FIGS. 1A and 1B, scanning in range is accomplished by directing beam 12 downward along the boresight $R_O$ at an angle $\beta$ with respect to the horizontal. A pulse 14 has a two-way scanning velocity C/2 (one-half the speed of light) of approximately $1.5 \times 10^8$ m/sec Scanning in azimuth, on the other hand, is provided by the forward movement of the vehicle 10 and changing the angle $\alpha$. The scanning velocity v in azimuth is typically 50 m/sec. for aircraft. For operating in the non-scanning squint mode, the beam is directed at an angle $\alpha$ which is less than 90° relative to the forward motion of the aircraft 10. For what is termed the spot mode, the beam remains at a fixed spot on the ground during the movement of the aircraft.

Referring to FIGS. 15A and 15B, the azimuth resampling time may be also controlled to provide equiangular azimuth samples about the ground boresight point. As shown in 15A, the sampling rate increases when the tangential velocity component increases and conversely upon deceleration. Note the expanding distance between points from $m=0$ to $m=5$ of FIG. 15A illustrating the positions of the radar platform at each transmission with a constant PRF radar. In FIG. 15B, the signals resampled by the keystone interpolator 43 represents data taken at equi-angular intervals $\Delta\alpha$. Using a small angle approximation, it is apparent that the two-way RF phase change between the reference boresight point B and target T displaced distance S from B in azimuth exhibits a constant frequency in units of samples, i.e.

$$f_d = \frac{2\Delta\alpha S}{\lambda} \text{ in units of cycles/sample}$$

$$\approx \frac{2\Delta\alpha S}{R}$$

which is constant if $\Delta\alpha$ is constant for small angles. A given target doppler will remain in a correlator filter during the coherent integration time, thus compensating for the tangential acceleration component of the platform velocity. Whereas approximations are used in the instant example, exact azimuth resampling times may be readily computed from vehicle motion data of the inertial navigation system using elementary well-known geometric relationships.

What has been shown and described, therefore, is a two-stage high resolution synthetic aperture radar utilizing digital processors which are capable of performing the discrete Fourier transform, and more particularly the fast Fourier transform includes an azimuth interpolatorprefilter 43 that resamples the azimuth data such that the sampling rate varies inversely with range. Thus, both the variable scale factor and asynchronism is overcome; and the speed of the second stage fast Fourier transform processor is independent of range and is exactly synchronous among range cells.

Having disclosed what is at present considered to be the preferred embodiment of the subject invention.

What I claim is:

1. A method of processing digital data samples in azimuth for a synthetic aperture radar, comprising sampling the azimuth digital data for each range cell for the coherent integration time of each target and varying the rate of such sampling as a function of the range cell corresponding to such samples.

2. A method of processing digital data samples in azimuth for a synthetic aperture radar according to claim 1, wherein the step of varying the sampling rate, comprises decreasing the rate of sampling the azimuth data samples for each range cell as the distance corresponding to such range cell increases.

3. A method of providing a synchronized rectilinear image output for a synthetic aperture radar, comprising
    sequentially transmitting and receiving a plurality of radar pulses having a predetermined interpulse period to provide for each received pulse complex digital data samples corresponding to each range cells during its respective coherent integration time period, and
    performing a time correction in azimuth for each of the complex digital data samples, said time correction being a function of a respective range cell to provide digital data samples in azimuth at a rate that decreases as the distance corresponding to a particular range cell increases.

4. A method of providing a synchronized rectilinear image output for a synthetic aperture radar having first and second order motion compensation, said method comprising
    sequentially transmitting and receiving a plurality of radar pulses having a predetermined interpulse period to provide for each received pulse complex digital data samples corresponding to a predetermined number of respective range cells during its respective coherent integration time period,
    performing a first time correction and phase shift on each of the complex digital data samples to effect a first order motion compensation thereon, and
    performing a second time correction for the complex digital data samples of each of the predetermined number of range cells to provide azimuth data samples at a rate that decreases as the range increases.

5. A method of processing received radar pulses from a synthetic aperture radar, comprising
   converting the received radar pulses to digital data samples,
   storing the digital data samples in real time,
   feeding out the stored data samples at a lower constant rate during approximately the entire interpulse period,
   sampling the fed data samples corresponding to azimuth at a rate that varies inversely with range, and
   effecting a first correlation of the samples in azimuth to effect time-frequency discrimination samples corresponding to a plurality of synthetic subbeams.

6. A method according to claim 5 further comprising the step of
   providing a phase shift and time correction to the signal samples prior to the sampling step to provide first order motion compensation.

7. A method according to claim 5 or 6 further comprising
   maintaining constant the data corresponding to doppler frequency for a target area from the leading edge to trailing edge of each radar beam subsequent to the sampling step.

8. A method of processing target data in a synthetic aperture radar, comprising
   sequentially transmitting and receiving a plurality of radar pulses during respective coherent integration time period, said radar pulses having a predetermined interpulse period and providing analog signals therefrom,
   converting each analog signal into complex digital data samples corresponding to a predetermined number of respective range cells during said time periods,
   sequentially entering said complex data samples into a memory in sets of digital data time samples for a selected number of interpulse periods,
   resampling said complex data samples corresponding to azimuth at a rate for each range cell that increases as the distance corresponding to such range cell decreases,
   correcting said data samples corresponding to the doppler frequency of a target area from the leading edge to trailing edge of each radar beam constant,
   sequentially feeding the constant doppler data samples for each beam into a digital correlator to provide a plurality of frequency bands in azimuth that correspond to synthetic subbeams sequentially feeding data samples for synthetic subbeams into a memory having storage times at least equal to each such time period in selected sets of range cells,
   feeding out the data samples corresponding to synthetic subbeams over a predetermined number of interpulse periods into another digital correlator into data reflective of a respective plurality of sub-subbeams which correspond to azimuth cells,
   and feeding the sub-subbeam data to synthetic aperture display apparatus.

9. A method according to claim 8 further comprising
   performing a first time correction and phase shift on each complex data sample to effect a first order motion compensation thereon prior to the resampling step.

10. A synthetic aperture radar system comprising
    means for sequentially transmitting and receiving a plurality of radar pulses during their respective coherent integration time periods, said radar pulses having a predetermined interpulse period and providing analog signals therefrom,
    means for converting each analog signal into complex digital data samples corresponding to a predetermined number of respective range cells during said coherent integration time period,
    means for sequentially entering said complex data samples into a memory in sets of digital data time samples for a selected number of interpulse periods,
    means for resampling said complex data samples corresponding to azimuth at a rate for each range cell that increases as the distance corresponding to such range cell decreases,
    means for correcting said data samples to render constant the data corresponding to doppler frequency of a target area from the leading edge to trailing edge of each radar beam,
    means for sequentially feeding the constant doppler data samples for each beam into a digital correlator to provide a plurality of frequency bands in azimuth that correspond to synthetic subbeams,
    means for sequentially feeding data samples for synthetic subbeams into a memory in selected sets of range styles,
    means for feeding out the data samples corresponding synthetic subbeams over a predetermined number of interpulse periods into another digital correlator to provide data reflective of a respective plurality of subbeams which correspond to azimuth cells,
    and means for feeding the sub-subbeam data to synthetic aperture display apparatus.

11. A system according to claim 10, further comprising means for performing a first time correction and phase shift on each complex data sample to effect a first order motion compensation.

12. A system according to claim 11, further comprising means to perform a second time correction and phase shift on each synthetic subbeam to effect second order motion compensation.

* * * * *